Patented Sept. 27, 1932

1,879,904

UNITED STATES PATENT OFFICE

GEORG KRÄNZLEIN, OF FRANKFORT-ON-THE-MAIN-HOCHST, RICHARD KARL MÜLLER, OF BAD SODEN-ON-THE-TAUNUS, AND LUDWIG WILHELM BERLIN, OF FRANKFORT-ON-THE-MAIN-HOCHST, GERMANY, ASSIGNORS TO I. G. FARBENINDUSTRIE AKTIEN-GESELLSCHAFT, OF FRANKFORT-ON-THE-MAIN, GERMANY

POSITIVE ELECTRODE AND PROCESS OF PREPARING THE SAME

No Drawing. Application filed October 18, 1929, Serial No. 400,730, and in Germany November 3, 1928.

The present invention relates to positive electrodes for accumulators employing an alkaline electrolyte and to a process of preparing them.

It is known that, in order to utilize as much as possible the active mass in accumulators employing an alkaline electrolyte and positive electrodes formed with an active mass which consists of oxygen compounds of nickel or cobalt, there are added to the said active mass substances like graphite, nickel spangles or any other electric conductor in various forms. However, the capacity of accumulators employing such electrodes is not increased by this addition in a greater measure than by about 40–45 per cent.

We have now found that the capacity can be increased by about 60–65 per cent. by using a foliated graphite, the laminæ of which are retained on a sieve of 0.26 mm. mesh, but pass through a sieve of 0.75 mm. mesh, while maintaining as far as possible their form and structure.

A graphite of the said kind gives the following figures on being sifted:

Width of mesh:
Over 1.19 mm. = 0.0 per cent
Over 0.75 mm. = 1.45 per cent
Over 0.26 mm. = 94.2 per cent
Below 0.26 mm. = 4.1 per cent
Loss by sieving = 0.25 per cent If there is used a foliated graphite the laminæ of which are of a smaller size, for instance, such that they are retained on a sieve of 0.06 mm. mesh but pass through a sieve of 0.26 mesh, the capacity of the accumulators, in the manufacture of which the said graphite is used, is still by 20 per cent. superior to that of the accumulators at present on the market, and by about 10 per cent. superior to the capacity of the accumulators in the preparation of which lithium has been added to the electrolyte.

In many kinds of commercial graphite there is contained more or less impurity which has a detrimental effect on the accumulator. Small quantities of iron which thus become a part of the anodes are, for instance, highly injurious to the accumulator, because, when the accumulator is charged, the noxious ferric acid may be formed. It is, therefore, necessary to free the graphite which is to be used, from the said injurious impurity; this can be done by cleaning it by boiling with an acid, for instance, hydrochloric acid, and subsequently treating it with an alkali.

In order to obtain from the beginning the above indicated improved capacity, the active mass may be compressed with a pressure of about 2700–3500 kilos per square centimetre. If a lower pressure is applied, the capacity is generally at first lower and only increases after the lapse of some time (for instance, after about 50–100 discharges have occurred) to the aforesaid degree. It is advantageous to moisten slightly the active mass before it is pressed, whereby the mass is prevented from swelling too much while it operates in the accumulator.

In this process it was found that highly viscous water-soluble liquids, such as glycerine, are especially useful moistening agents. The plates are formed as usual, while exchanging the electrolyte after the first discharges.

The following examples illustrate the invention, but they are not intended to limit it thereto.

(1) 80 parts of freshly precipitated nickel hydroxide, 20 parts of foliated graphite the laminæ of which are retained on a sieve of 0.26 mm. mesh but pass through a sieve of 0.75 mm. mesh, and 10 parts of water are thoroughly mixed with each other in a kneading and mixing machine, while avoiding considerable alteration of the size of the graphite laminæ. This mixture is then compressed in a suitable mould under a pressure of about 3500 kilos per sq. cm. into tablets which are then charged into perforated pockets and worked up into plates. After about 6 electrical discharges have occurred, the amp./hours per gram of plate-weight amounts to 0.081–0.088, in comparison with which that of the plates now on the market amount to 0.054–0.064, corresponding with an increased capacity of 50–40 per cent.

In like manner the active mass can be compressed into bars, these are introduced into the corresponding perforated tubes and if required again pressed in the tubes; which latter are then closed in the usual manner and finally united to form electrodes; in this case results are obtained similar to those above mentioned.

(2) 80 parts of freshly precipitated nickel hydroxide, 20 parts of pure foliated graphite, containing 99.5 per cent of carbon and containing 80 per cent of laminæ which are retained on a sieve of 0.26 mm. mesh and pass through a sieve of 0.43 mm. mesh respectively are thoroughly mixed with 7 parts of glycerine for about 8–10 minutes in a kneading and mixing machine. This mixture is then preliminarily pressed in a suitable mould under a pressure of 1600 kilos per sq. cm., again reduced to small pieces and finally compressed in a suitable mould under a pressure of about 3500 kilos per sq. cm. into tablets which are then charged, as usual, into perforated pockets and worked up into plates. After about 6 electrical discharges have occurred, the amp./hours per gram of plate-weight amounts to 0.089, corresponding with an increased capacity of about 40 per cent in comparison with the plates now on the market.

We claim:

1. In a process of preparing positive electrodes for accumulators operated with an alkaline electrolyte and having oxygen compounds of a metal of the group consisting of nickel and cobalt as the active mass of the positive electrodes, the steps which consist in moistening said active mass with a highly viscous water-soluble agent and then pressing it under a pressure of between 2700 and 3500 kilos per square centimeter together with a foliated graphite, the laminæ of which are retained on a sieve of 0.06 mm. mesh, but which pass through a sieve of 0.75 mm. mesh.

2. In a process of preparing positive electrodes for accumulators operated with an alkaline electrolyte and having oxygen compounds of a metal of the group consisting of nickel and cobalt as the active mass of the positive electrodes, the steps which consist in moistening said active mass with glycerin and then pressing it under a pressure of between 2700 and 3500 kilos per square centimeter together with a foliated graphite, the laminæ of which are retained on a sieve of 0.26 mm. mesh, but which pass through a sieve of 0.75 mm. mesh.

3. In a process of preparing positive electrodes for accumulators operated with an alkaline electrolyte and having oxygen compounds of nickel as the active mass of the positive electrodes, the steps which consist in moistening said active mass with a highly viscous water-soluble agent and then pressing it under a pressure of between 2700 and 3500 kilos per square centimeter together with a foliated graphite which has been freed from all impurities, especially from iron, and the laminæ of which are retained on a sieve of 0.06 mm. mesh, but which pass through a sieve of 0.75 mm. mesh.

4. In a process of preparing positive electrodes for accumulators operated with an alkaline electrolyte and having oxygen compounds of nickel as the active mass of the positive electrodes, the steps which consist in moistening said active mass with glycerin and then pressing it under a pressure of between 2700 and 3500 kilos per square centimeter together with a foliated graphite which has been freed from all impurities, especially from iron, and the laminæ of which are retained on a sieve of 0.26 mm. mesh, but which pass through a sieve of 0.75 mm. mesh.

5. As new products, positive electrodes for accumulators employing an alkaline electrolyte, said electrodes comprising a compressed mixture containing oxygen compounds of a metal of the group consisting of nickel and cobalt, as the active mass, and a foliated graphite, the laminæ of which are retained on a sieve of 0.06 mm. mesh, but pass through a sieve of 0.75 mm. mesh.

6. As new products, positive electrodes for accumulators employing an alkaline electrolyte, said electrodes comprising a compressed mixture containing oxygen compounds of a metal of the group consisting of nickel and cobalt, as the active mass, a highly viscous water-soluble agent, as the binding material, and a foliated graphite freed from all impurities, especially iron, and the laminæ of which are retained an a sieve of 0.06 mm. mesh, but which pass through a sieve of 0.75 mm. mesh.

7. As new products, positive electrodes for accumulators employing an alkaline electrolyte, said electrodes comprising a compressed mixture containing oxygen compounds of nickel, as the active mass, a highly viscous water-soluble agent, as the binding material, and a foliated graphite, the laminæ of which are retained on a sieve of 0.06 mm. mesh, but which pass through a sieve of 0.75 mm. mesh.

8. As new products, positive electrodes for accumulators employing an alkaline electrolyte, said electrodes comprising a compressed mixture containing oxygen compounds of nickel, as the active mass, glycerin, as the binding material, and a foliated graphite freed from all impurities, especially iron, and the laminæ of which are retained on a sieve of 0.26 mm. mesh, but which pass through a sieve of 0.75 mm. mesh.

In testimony whereof, we affix our signatures.

GEORG KRÄNZLEIN.
RICHARD KARL MÜLLER.
LUDWIG WILHELM BERLIN.